US012627641B2

(12) United States Patent
Kalish

(10) Patent No.: US 12,627,641 B2
(45) Date of Patent: May 12, 2026

(54) SYSTEM AND METHOD FOR SECURING MESSAGES

(71) Applicant: Kalibro Technologies Ltd., Rishpon (IL)

(72) Inventor: Danny Kalish, Raanana (IL)

(73) Assignee: Kalibro Technologies Ltd., Rishpon (IL)

( * ) Notice: Subject to any disclaimer, the term of this patent is extended or adjusted under 35 U.S.C. 154(b) by 351 days.

(21) Appl. No.: 17/547,504

(22) Filed: Dec. 10, 2021

(65) Prior Publication Data

US 2022/0191177 A1 Jun. 16, 2022

Related U.S. Application Data

(60) Provisional application No. 63/123,866, filed on Dec. 10, 2020.

(51) Int. Cl.
*H04L 9/40* (2022.01)

(52) U.S. Cl.
CPC ...... *H04L 63/0435* (2013.01); *H04L 63/0236* (2013.01); *H04L 63/1416* (2013.01); *H04L 63/145* (2013.01); *H04L 63/20* (2013.01)

(58) Field of Classification Search
CPC .............. H04L 63/145; H04L 63/0435; H04L 63/0236; H04L 63/1416; H04L 63/20
See application file for complete search history.

(56) References Cited

U.S. PATENT DOCUMENTS

| | | | |
|---|---|---|---|
| 7,478,330 B1 * | 1/2009 | Branson ................ | G06F 16/957 |
| | | | 715/764 |
| 8,521,667 B2 | 8/2013 | Zhu et al. | |
| 8,756,617 B1 * | 6/2014 | Boodman ........... | H04L 63/0823 |
| | | | 726/25 |
| 8,869,271 B2 | 10/2014 | Jayaraman et al. | |
| 8,959,628 B2 * | 2/2015 | Coppock ............... | H04L 63/145 |
| | | | 726/22 |

(Continued)

FOREIGN PATENT DOCUMENTS

| | | |
|---|---|---|
| EP | 2975534 A1 | 1/2016 |
| EP | 2532136 B1 | 8/2017 |
| GB | 2550657 A | 11/2017 |

OTHER PUBLICATIONS

M. Sonntag, "Securing webpages—An overview," 2010 International Conference on Information Society, London, UK, 2010, pp. 641-646. (Year: 2010).*

(Continued)

*Primary Examiner* — Kari L Schmidt
(74) *Attorney, Agent, or Firm* — FisherBroyles, LLP; Roger L. Browdy; James E. Mrose

(57) ABSTRACT

A secure method for opening network communication link/ address (URL), at computer device, including identifying initiation for opening network communication link by designated browsing application, wherein the designated browsing application is configured only for presenting content of website addressed by the communication link using limited HTML code not including commands which includes at least one of: script language codes or CSS (cascading style); creating or extracting image or text of webpage associated with network communication link and presenting user with image and/or text.

18 Claims, 5 Drawing Sheets

(56)                References Cited

U.S. PATENT DOCUMENTS

| | | | | |
|---|---|---|---|---|
| 9,055,048 | B2 | 6/2015 | Shepherd et al. | |
| 9,300,686 | B2 | 3/2016 | Pidathala et al. | |
| 10,558,824 | B1* | 2/2020 | Remington | H04L 67/02 |
| 11,005,819 | B1* | 5/2021 | Song | G06F 12/1408 |
| 11,528,297 | B1* | 12/2022 | Chiaraviglio | H04L 63/1483 |
| 2003/0033606 | A1* | 2/2003 | Puente | H04N 7/17336 |
| | | | | 725/87 |
| 2005/0182928 | A1* | 8/2005 | Kamalanathan | G06F 21/52 |
| | | | | 713/164 |
| 2006/0041837 | A1* | 2/2006 | Amir | G06F 21/57 |
| | | | | 717/115 |
| 2007/0016949 | A1* | 1/2007 | Dunagan | G06F 21/6263 |
| | | | | 726/25 |
| 2008/0229427 | A1* | 9/2008 | Ramirez | H04L 67/02 |
| | | | | 726/26 |
| 2009/0222925 | A1* | 9/2009 | Hilaiel | G06F 21/53 |
| | | | | 726/25 |
| 2012/0304295 | A1* | 11/2012 | Reumann | H04L 63/1441 |
| | | | | 726/22 |
| 2013/0212465 | A1* | 8/2013 | Kovatch | G06F 40/143 |
| | | | | 715/234 |
| 2014/0380472 | A1 | 12/2014 | Peterson et al. | |
| 2015/0161277 | A1* | 6/2015 | Heller | G06F 16/954 |
| | | | | 715/229 |
| 2015/0347754 | A1* | 12/2015 | Born | G06F 21/567 |
| | | | | 726/24 |
| 2015/0365359 | A1* | 12/2015 | Hasan | H04L 51/04 |
| | | | | 709/206 |
| 2015/0379155 | A1* | 12/2015 | Meng | G06F 16/9566 |
| | | | | 715/234 |
| 2016/0182537 | A1* | 6/2016 | Tatourian | H04L 63/145 |
| | | | | 726/23 |
| 2017/0070509 | A1* | 3/2017 | Giura | H04L 67/02 |
| 2017/0090734 | A1* | 3/2017 | Fitzpatrick | G06F 3/0486 |
| 2017/0140494 | A1* | 5/2017 | Marchiori | G06T 1/20 |
| 2018/0048671 | A1* | 2/2018 | Shekyan | G06F 21/56 |
| 2018/0084002 | A1 | 3/2018 | Shnitzer | |
| 2019/0068638 | A1* | 2/2019 | Bartik | H04L 63/1483 |
| 2019/0138711 | A1* | 5/2019 | Yaffe | G06F 16/2379 |
| 2020/0175198 | A1* | 6/2020 | Moffat | H04L 9/0891 |
| 2020/0257437 | A1* | 8/2020 | Fitzpatrick | G06F 3/0486 |
| 2020/0293160 | A1* | 9/2020 | Soyarslan | G06F 3/0482 |
| 2021/0067494 | A1* | 3/2021 | Azulay | H04L 63/1466 |
| 2021/0084055 | A1* | 3/2021 | Avraham | H04L 63/1416 |
| 2021/0092155 | A1* | 3/2021 | Wang | H04L 63/083 |

OTHER PUBLICATIONS

Lekies, Sebastian, et al. "Code-reuse attacks for the web: Breaking cross-site scripting mitigations via script gadgets." Proceedings of the 2017 ACM SIGSAC Conference on Computer and Communications Security. 2017, pp. 1709-1723. (Year: 2017).*

* cited by examiner

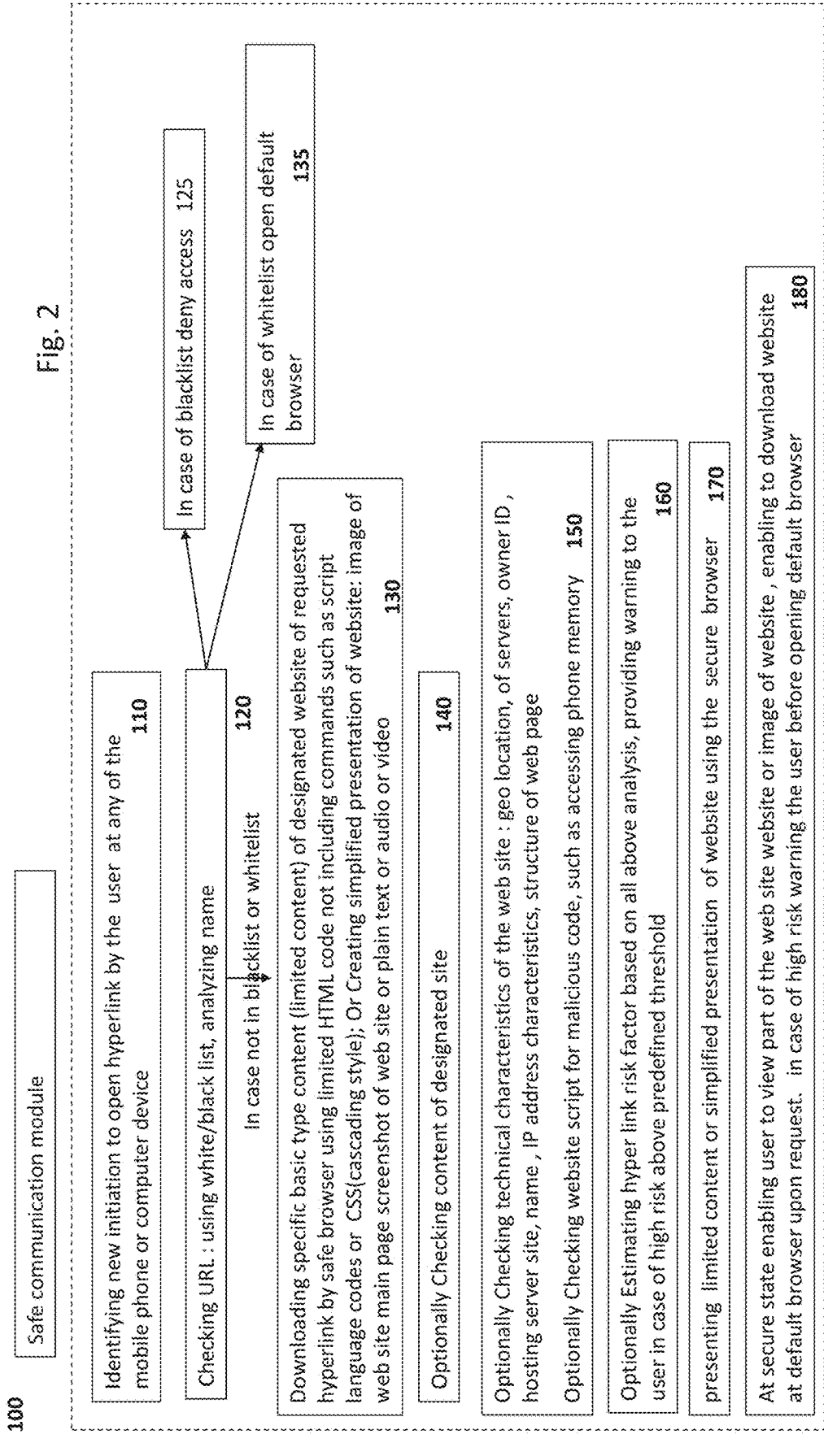

Safe communication module

Identifying new initiation to open hyperlink by the user at any of the mobile phone or computer device   110

Checking URL : using white/black list, analyzing name   120

In case of blacklist deny access   125

In case not in blacklist or whitelist

In case of whitelist open default browser   135

Downloading specific basic type content (limited content) of designated website of requested hyperlink by safe browser using limited HTML code not including commands such as script language codes or CSS(cascading style); Or Creating simplified presentation of website: image of web site main page screenshot of web site or plain text or audio or video   130

Optionally Checking content of designated site   140

Optionally Checking technical characteristics of the web site : geo location, of servers, owner ID , hosting server site, name , IP address characteristics, structure of web page Optionally Checking website script for malicious code, such as accessing phone memory   150

Optionally Estimating hyper link risk factor based on all above analysis, providing warning to the user in case of high risk above predefined threshold   160 presenting limited content or simplified presentation of website using the secure browser   170

At secure state enabling user to view part of the web site website or image of website , enabling to download website at default browser upon request.   in case of high risk warning the user before opening default browser   180

Figure 3:
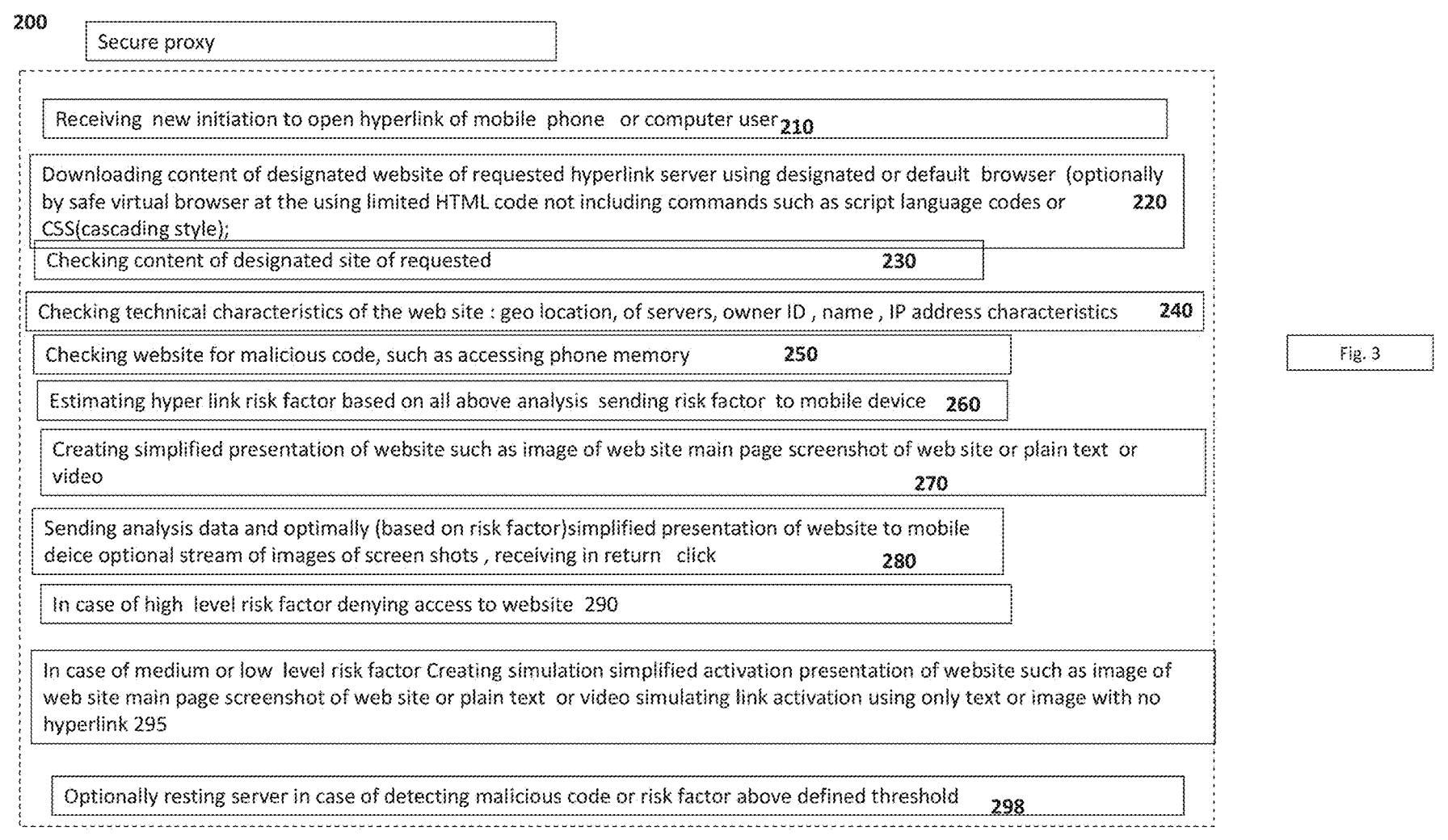

Secure proxy

Receiving  new initiation to open hyperlink of mobile  phone   or computer user 210

Downloading content of designated website of requested hyperlink server using designated or default  browser (optionally by safe virtual browser at the using limited HTML code not including commands such as script language codes or   220 CSS(cascading style);

Checking content of designated site of requested   230

Checking technical characteristics of the web site : geo location, of servers, owner ID , name , IP address characteristics   240

Checking website for malicious code, such as accessing phone memory   250

Estimating hyper link risk factor based on all above analysis  sending risk factor  to mobile device   260

Creating simplified presentation of website such as image of web site main page screenshot of web site or plain text  or video   270

Sending analysis data and optionally (based on risk factor)simplified presentation of website to mobile deice optional stream of images of screen shots , receiving in return  click   280

In case of high  level risk factor denying access to website  290

In case of medium or low  level risk factor Creating simulation simplified activation presentation of website such as image of web site main page screenshot of web site or plain text  or video simulating link activation using only text or image with no hyperlink 295

Optionally resting server in case of detecting malicious code or risk factor above defined threshold   298

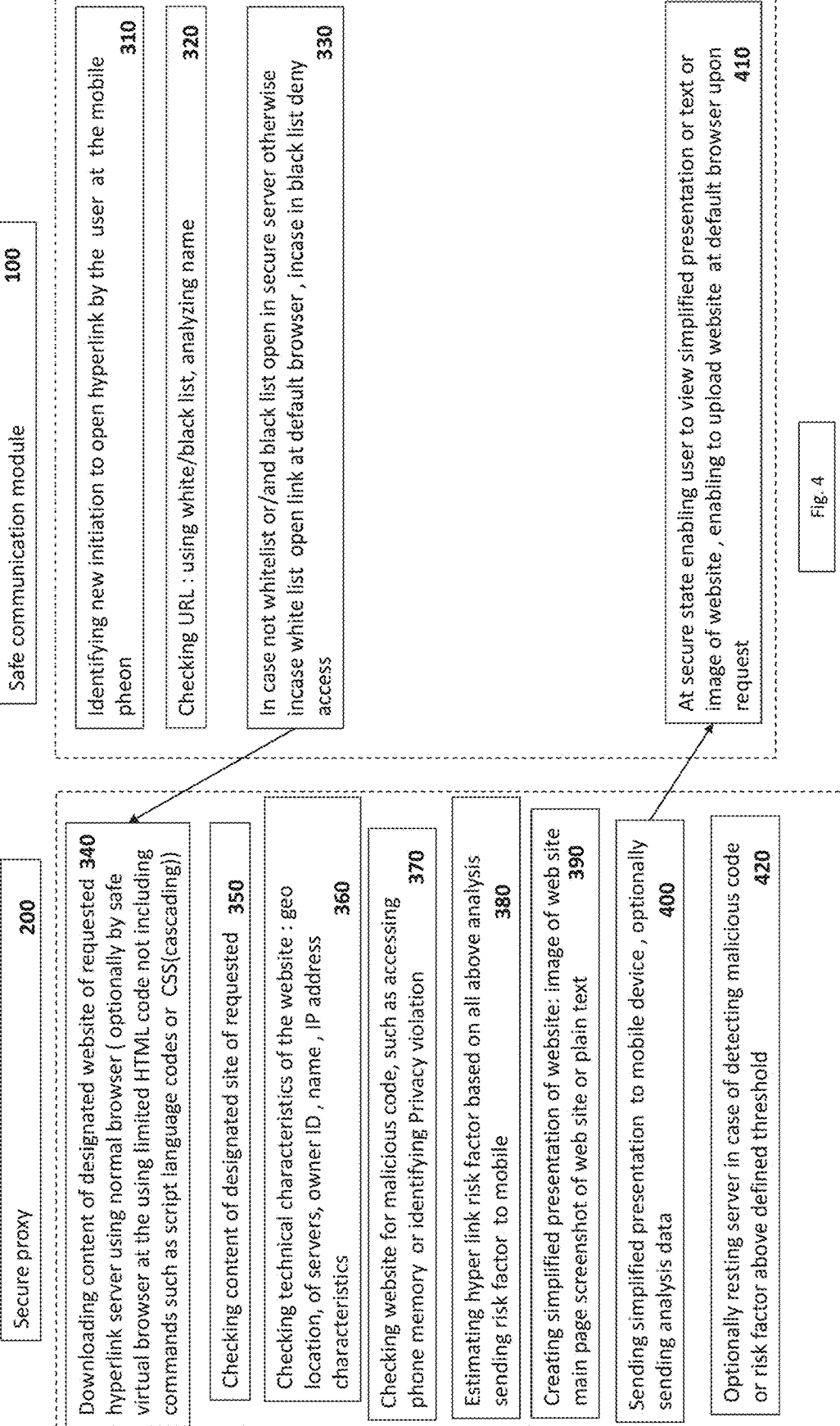

Fig. 4

Safe communication module    100

Identifying new initiation to open hyperlink by the user at the mobile pheon    310

Checking URL : using white/black list, analyzing name    320

In case not whitelist or/and black list open in secure server otherwise incase white list open link at default browser , incase in black list deny access    330

At secure state enabling user to view simplified presentation or text or image of website , enabling to upload website at default browser upon request    410

Secure proxy    200

Downloading content of designated website of requested    340 hyperlink server using normal browser ( optionally by safe virtual browser at the using limited HTML code not including commands such as script language codes or CSS(cascading))

Checking content of designated site of requested    350

Checking technical characteristics of the website : geo location, of servers, owner ID , name , IP address characteristics    360

Checking website for malicious code, such as accessing phone memory or identifying Privacy violation    370

Estimating hyper link risk factor based on all above analysis sending risk factor to mobile    380

Creating simplified presentation of website: image of web site main page screenshot of web site or plain text    390

Sending simplified presentation to mobile device , optionally sending analysis data    400

Optionally resting server in case of detecting malicious code or risk factor above defined threshold    420

SYSTEM AND METHOD FOR SECURING MESSAGES

FIELD OF THE INVENTION

The present invention relates generally to security of electronic message.

BACKGROUND

The known art discloses different methods which provide solution for evaluating the risk of hyperlinks, by analyzing different parameters related with network communication links.

Other prior art disclose browser having safe mode which restrict user from using different functions, such as the following applications and patents: EP2532136B, US2017070509 U.S. Pat. Nos. 8,869,271, 930,068, 9,300, 686, 8,521,667, US20140380472, GB2550657A, or US2018084002.

U.S. Pat. No. 9,055,048 disclose a method for interacting with a user, comprising communicating with at least one cooperative server through a normal browser, automatically receiving encrypted data having an associated received type code indicative of a requirement for a secure browser having restricted functionality with respect to a functionality of the normal browser; selectively and automatically invoking the secure browser for handling of the received encrypted data based on the received type code associated with the received encrypted data; receiving the encrypted data with the invoked secure browser for handling thereof, wherein the received encrypted data is not available for use by the user in the normal browser and the invoked secure browser imposes restrictions on availability outside of the secure browser of decrypted data derived from the encrypted data; and communicating an input from the user, through the secure browser, to the at least one cooperative server.

The secure web browser prevents use of one or more of the following functions: save, copy, and navigate to unrestricted documents.

EP application No. 2975534, disclose a method for securely accessing web pages, the method comprises: transmitting from a client browser a request for retrieving a web page; receiving the request from the client browser by a server browser; gathering, by the server browser, a source code and one or more embedded objects of the requested web page, wherein the one or more embedded objects are gathered only if the web page comprises at least one or more embedded objects; rendering, by the server browser, the source code of the web page and generating a DOM, document object model, tree for creating a first visual representation of the web page, wherein the first visual representation comprises the DOM tree and said embedded objects; and transmitting said DOM tree and said embedded objects of the web page from the server browser to the client browser, so that the client browser is able to create a second visual representation of the webpage, wherein the second visual representation is substantially the same as the first visual representation US application No. 2017070509, disclose a system for providing secure browsing via a transparent network proxy is disclosed. The system may receive, from a client, a request to access a resource. The request may include an identifier that may be utilized to locate the resource. Once the request is received, the system may determine if the resource is not trusted, such as if the identifier is determined to be unknown or suspicious. If the resource is determined to not be trusted by the system, the system may forward the request to a virtual machine manager that may select a browser virtual machine from a pool of browser virtual machines. After the browser virtual machine is selected, the browser virtual machine may stream a rendering of the resource to the client based on the request. The rendering of the resource may be provided in lieu of the actual resource.

US application No. US2011191849, disclose A method in one example implementation includes sending a first request to a first network address on a first server and determining whether the first network address has been redirected on the server to a second network address. The method further includes searching a memory element for a predetermined risk rating associated with the second network address if the first network address has been redirected to the second network address. The method also includes providing a risk response to a client if a predetermined risk rating is found. In more specific embodiments, the risk response includes sending an alert to the client or blocking the client from accessing the second network address if the predetermined risk rating indicates the second network address is malicious.

US application No. US2015007312, disclose in response to receiving a plurality of uniform resource locator (URL) links for malicious determination, any known URL links are removed from the URL links based on a list of known link signatures. For each of remaining URL links that are unknown, a link analysis is performed on the URL link based on link heuristics to determine whether the URL link is suspicious. For each of the suspicious URL links, a dynamic analysis is performed on a resource of the suspicious URL link. It is classified whether the suspicious URL link is a malicious link based on a behavior of the resource during the dynamic analysis.

US application No. US2012158626, disclose techniques for using features extracted from a URL to detect a malicious URL and categorize the malicious URL as one of a phishing URL, a spamming URL, a malware URL or a multi-type attack URL. The techniques employ one or more machine learning algorithms to train classification models using a set of training data which includes a known set of benign URLs and a known set of malicious URLs. The classification models are then employed to detect and/or categorize a malicious URL.

GB application NO. 550657, disclose protecting a user against phishing attacks by identifying links in incoming electronic messages 7, storing a list of non-threat internet domains relevant to the user or organization 6, where each internet domain comprises at least a second level domain, internet address or URL, identifying suspect internet domains in hyperlinks in incoming messages 8, assessing whether one of the suspect domains is a threat by comparing the similarity of a digital image of the suspect domain and of a non-threat domain using an image similarity assessment algorithm 12 and preventing the user from controlling a computer via a message client to follow the identified threat hyperlink 13. The assessment may include assessing a characteristic of domain information such as date of registration 12, or assessing text similarity 10 against a list of known pairs of single or double character homoglyphs and may result in blocking or deleting messages containing threat hyperlinks.

US application No. US2018084002 disclose a method for malicious hyperlink protection, the method may include receiving, by a risk management computer, a first file that is aimed to a computer of a user; storing the first file in a memory of the risk management computer; searching, by the risk management computer, for a hyperlink that is included in the first file and links to target content that is included in a target website; when finding the hyperlink then evaluating, at least partially by the risk management computer, whether the hyperlink imposes a risk; preventing the user from utilizing the hyperlink for accessing the target content before a completion of the evaluating of whether the hyperlink imposes the risk; and wherein when evaluating that the hyperlink imposes the risk then: modifying the file to provide a modified file; wherein the modifying of the file comprises deleting the hyperlink or replacing the hyperlink with a modified hyperlink; wherein the modified hyperlink links to a web entity that differs from the target website; and sending the modified file to the computer of the user.

EP application No. 2532136, disclose a method in one example implementation includes sending a first request to a first network address on a first server and determining whether the first network address has been redirected on the server to a second network address. The method further includes searching a memory element for a predetermined risk rating associated with the second network address if the first network address has been redirected to the second network address. The method also includes providing a risk response to a client if a predetermined risk rating is found. In more specific embodiments, the risk response includes sending an alert to the client or blocking the client from accessing the second network address if the predetermined risk rating indicates the second network address is malicious. In other more specific embodiments, the first network address is redirected to one or more other network addresses before being redirected to the second network address.

SUMMARY OF THE INVENTION

The present invention provides a secure method for opening network communication link/address (URL), at computer device, said method implemented by one or more processors operatively coupled to a non-transitory computer readable storage device, on which are stored modules of instruction code that when executed cause the one or more processors to perform:

identifying initiation for opening network communication link, by designated browsing application, wherein the designated browsing application is configured only for presenting content of website addressed by the communication link using limited HTML code which including only content objects of text, image, audio or video excluding commands, said commands including at least one of: script language codes or CSS (cascading style);

creating or extracting image and/or text or audio and/or video from the webpage associated with network communication link and presenting user with created or extracted image and/or text or audio and/or video.

The present invention provides a Secure method for opening network communication link/address (URL), at computer device, comprising the steps of:

Identifying initiation for opening network communication link; by designated browsing application, wherein the designated browsing application is configured only for presenting content of website addressed by the communication link using limited HTML code not including commands including at least one of: script language codes or CSS (cascading style);

creating or extracting image or text of webpage associated with network communication link and presenting user with image and/or text.

According to some embodiments of the present invention in case of unknown communication link checking technical properties of communication link address and technical properties of the web site/page the commination link is addressing, Estimating risk factor for the communication link;

wherein in case the risk is above predefined value blocking

According to some embodiments of the present invention further to extracting image or text of webpage, creating simplified presentation of website: image of web site main page screenshot of web site or plain text.

According to some embodiments of the present invention the method further comprising the steps of checking URL by using white/black list, wherein in case of black list block access, in case of white list enable access using default browser.

According to some embodiments of the present invention the method further comprising the steps of downloading content of designated website of requested hyperlink by safe browser.

According to some embodiments of the present invention the method further comprising the steps of downloading content of designated website of requested hyperlink at secure server and checking content of designated site, Creating image or text of at least the first page of the website sending to the mobile device and at secure state using secure browser enabling user to view text or image of website, enabling to upload website at default browser upon request.

According to some embodiments of the present invention the method further comprising the steps of Enabling the user to click on image or text simulating hyperlink of the web site identifying click relative image location on the image, Identifying click position on the image to identify the corresponding hyperlink and Executing identified clicked hyperlink in default browser and retrieving corresponding web page Elements to the mobile device.

According to some embodiments of the present invention checking technical characteristics of the web site include at least one of geo location, of servers, owner ID, hosting server site, name, IP address characteristics, structure of web page.

According to some embodiments of the present invention the method further comprising the steps of Checking website script for malicious code, such as accessing phone memory According to some embodiments of the present invention in case link is not whitelist or black list open link in secure server otherwise open link at default browser wherein the secure webserver performs analysis of technical properties of communication link address and technical properties of the web site/page the commination link is addressing The present invention provides A Secure system for opening network communication link/address (URL), at computer device, comprising the steps of:

designated browsing application for identifying initiation for opening network communication link, wherein the designated browsing application is configured only for presenting the user with image/ digital object having no active code;

wherein in case of unknown communication link checking technical properties of communication link address and/or technical properties of the web site/ page the commination link is addressing and Estimating risk factor for the communication link based on the check-up;

creating image or text of webpage associated with network communication link and presenting user with image or text.

According to some embodiments of the present invention, in case of unknown communication link checking technical properties of communication link address and technical properties of the web site/page the commination link is addressing, Estimating risk factor for the communication link;

wherein in case the risk is above predefined value blocking

According to some embodiments of the present invention designated browsing application further checks the URL: using white/black list and analyzing name of URL.

According to some embodiments of the present invention the designated browsing application further perform downloading content of designated website of requested hyperlink by safe browser.

According to some embodiments of the present invention the designated browsing application further perform downloading content of designated website of requested hyperlink at secure server and Checking content of designated site of requested.

According to some embodiments of the present invention the checking technical characteristics of the web site include at least one of geo location, of servers, owner ID, hosting server site, name, IP address characteristics, structure of web page.

According to some embodiments of the present invention the designated browsing application further checks website script for malicious code, such as accessing phone memory.

According to some embodiments of the present invention the designated browsing application further estimates hyper link risk factor based on analysis of link technical characteristics, wherein in case of risk factor above predefined threshold uploading website using default browser, otherwise open website in secure browser.

According to some embodiments of the present invention, in case link is not whitelist open link in secure server otherwise open link at default browser, wherein the secure webserver performs analysis of technical properties of communication link address and technical properties of the web site/page the commination link is addressing The present invention provides A Secure method for opening network communication link/address (URL), at computer device, comprising the steps of:

Identifying initiation for opening network communication link; by designated browsing application, wherein the designated browsing application is configured only for presenting content of website addressed by the communication link using limited HTML code not including commands including at least one of: script language codes or CSS (cascading style);

In case of unknown communication link creating or extracting image or text of webpage associated with network communication link and presenting user with image and/or text.

DESCRIPTION OF THE DRAWINGS

FIG. 2 depicts a flow diagram of the process Safe communication module, according to some embodiments of the present invention;

FIG. 3 depicts a flow diagram of the safe browsing interaction between the server and mobile device browser according to some embodiments of the present invention;

FIG. 4 depicts a flow diagram of the process carried out by server and phone according to some embodiments of the present invention;

DETAILED DESCRIPTION OF SOME EMBODIMENTS OF THE INVENTION

Figure 1:
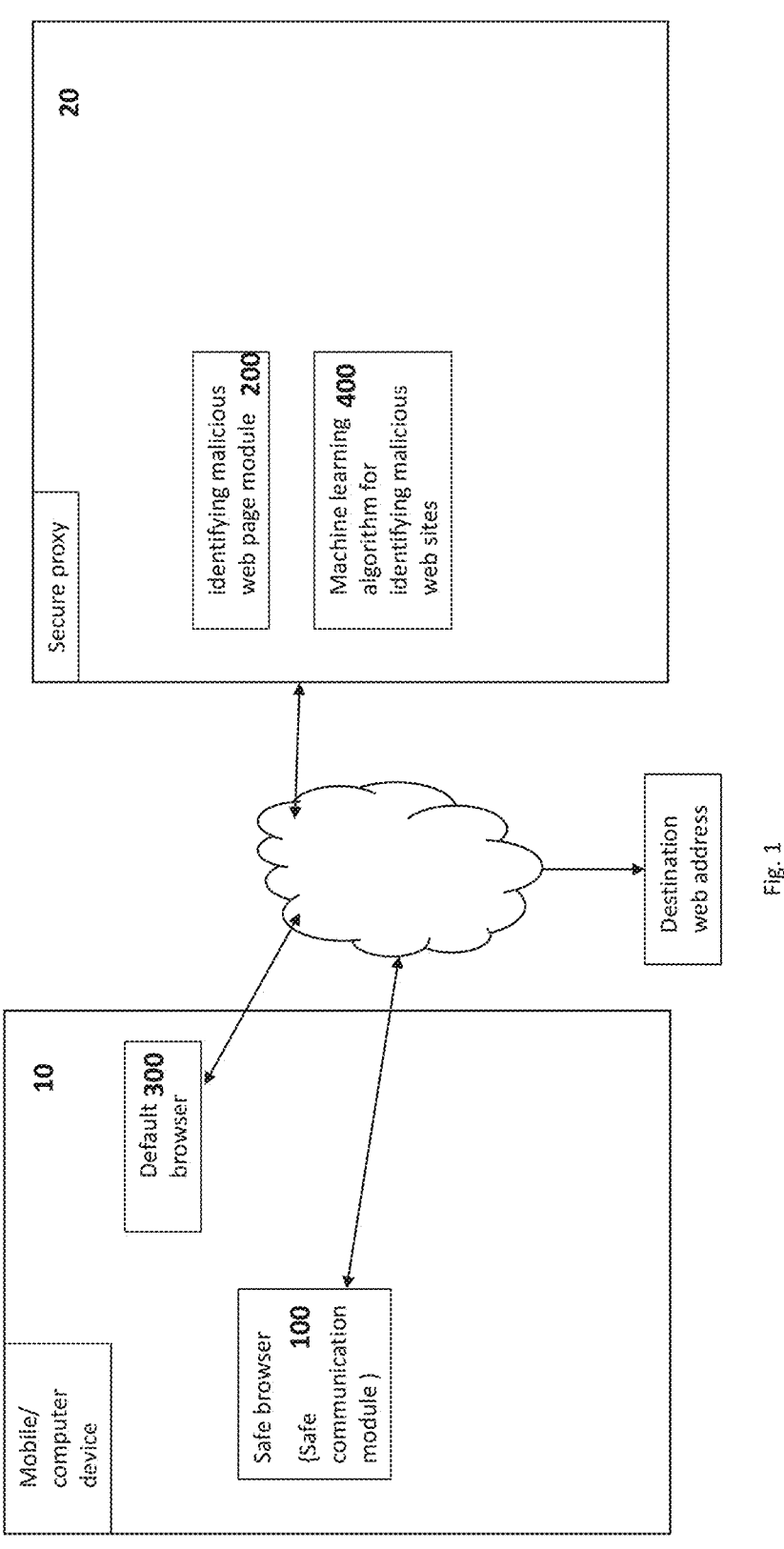
FIG. 1 depicts a block diagram of the safe browsing system components, according to one embodiment of this invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a table of definitions of the terms used throughout this application.

| Term | Definition |
|---|---|
| Mobile devices | Smart phone, tablets, laptop |
| External sources | Any web source which provides information of other websites, such a statistic, review, rating(clicks) |
| Internal or external information of user click within each web site | Services which provides statics information of user behavior within a website, usage of links, mouse tracking different area of the web site screen |

Web browsers currently in usage, such as Chrome or Explorer are typically flexible and open programs which aid the user in navigating the Internet, running programs or applets, and giving the user full control over what he/she is doing.

To enable more safe browsing there are known in the art "secure browsers" or "locked down browsers" or "kiosk software", which are versions of standard browsers which limit the functions that the user can perform.

The term of safe browser is known is the art, disclosing web browser installed on computers, which restrict user functionality to enable him assessment of web content, but not navigating through the net.

The secure browsers may allow a content provider to prevent users from printing, using the right-click on the mouse, saving the HTML, viewing the source, and accidentally exiting an assessment in a proctored environment. The look and feel of the screen displayed may otherwise correspond to that of a normal browser, except pages may not be stored (cached) in the history, and certain menu options and icons are not displayed or are made unavailable.

Such safe browser don't restrict from using commands which are part of HTML code, hence user are still at risk when using said safe browser. The secure browsers are required to be uploaded for estimating the risk, they cannot be activated upon risk assessment by normal browser.

According to the present invention is provided safe browser which restrict any action applied at web site HTML code with no script other than displaying image or text or playing sound file, enabling safe browsing. This browser is optionally activated only when the risk of the hyperlink is above pre-defined value.

The present invention provides a solution which enable the user to view the content related to the web browser in case where the hyperlink is identify above predefined risk value.

The present invention provides A secure method for opening network communication link/address (URL), at computer device, said method implemented by one or more processors operatively coupled to a non-transitory computer readable storage device, on which are stored modules of instruction code that when executed cause the one or more processors to perform:

identifying initiation for opening network communication link, by designated browsing application, wherein the designated browsing application is configured only for presenting content of website addressed by the communication link using limited HTML code which including only content objects of text, image, audio or video excluding commands, said commands including at least one of: script language codes or CSS (cascading style);

creating or extracting image and/or text or audio and/or video from the webpage associated with network communication link and presenting user with created or extracted, image and/or text or audio and/or video.

FIG. 1 depicts a block diagram of the safe browsing system components, according to one embodiment of this invention.

The system of the present invention comprises a mobile phone device 10 having a default browsing application 300, designated safe browsing application 100 (safe communication module) in communication with server 20, which comprise identifying malicious web page module (200). The safe browsing application is configured only for presenting content of website addressed by the communication link using basic limited HTML code not including script language codes or CSS (cascading style) including only text image, audio or video. Optionally the secure proxy 20 further include Machine learning algorithm for identifying malicious web sites (400).

According to some embodiments, the safe communication module, is working independently, as described in FIG. 2

According to some embodiments, the safe communication module, is working in cooperation with the server module 200, as described in FIG. 4

The present invention is directed to enable safe opening of hyperlink in any type electronic message such as email or SMS or WhatsApp by Identifying initiation for opening network communication link using a designated safe browsing application 100. The designated browsing application is configured only for presenting content of website addressed by the communication link using limited HTML code not including script language codes or CSS (cascading style), the safe browser is checking may apply Machine learning algorithm and fetch web site objects, including only image, video or text.

In case of unknown communication link checking technical properties of communication link address and technical properties of the web site/page, the commination link is addressing.

According to some embodiments of the present invention is suggested to estimate risk factor of the communication link based of web website and URL analysis.

FIG. 2 depicts a flow diagram of the process safe communication module according to some embodiments of the present invention;

Identifying new initiation to open hyperlink by the user at any of the mobile computing device such as: smart phone, PC, tablet laptop (110);

Optionally, checking URL: using white/black list, analyzing name; (120), In case of blacklist deny access 125, In case of whitelist open default browser.

In case not in blacklist or whitelist, downloading specific basic type content of designated website (limited content) of requested hyperlink by safe browser using limited HTML code not including commands such as script language codes or CSS (cascading style), or creating simplified presentation of website: image of web site main page screenshot of web site or plain text or audio or video; (130)

Optionally, checking content of designated site; (140)

Optionally, checking technical characteristics of the web site: geo location, of servers, owner ID, hosting server site, name, IP address characteristics, structure of web page.

Optionally, checking website script for malicious code, such as accessing phone memory; (150)

Estimating hyper link risk factor based on all above analysis, providing warning to the user in case of high risk above predefined threshold (160);

presenting limited content or simplified presentation of website using the secure browser (170);

At secure state enabling user to view part of the web site, or image of website (captured image), Optionally enabling to upload website at default browser upon request, in case of high risk warning the user before opening default browser (180);

FIG. 3 depicts a flow diagram of the process carried out by server according to some embodiments of the present invention.

The server process at least one of the following steps:

Receiving new initiation to open hyperlink of mobile computing device (210);

Downloading content of designated website of requested hyperlink by safe virtual browser at the server using limited HTML code not including not including commands such as script language codes or CSS (cascading style) (220);

Checking content of designated site of requested (230);

Checking technical characteristics of the web site: geo location, of servers, owner ID, hosting server site, name, IP address characteristics, structure of web page and Checking website for malicious code, such as accessing phone memory (240,250);

Estimating hyper link risk factor based on all above analysis sending risk factor to mobile device (260);

Checking website for malicious code, such as accessing phone memory (250);

Creating simplified presentation of website: image of web site main page screenshot of web site or plain text or video, or audio (270);

Sending analysis data and optimally (based on risk factor) simplified presentation of website to mobile deice optional stream of images of screen shots, receiving in return click (280);

In case of high-level risk factor denying access to website (290);

In case of medium or low-level risk factor Creating simulation simplified activation presentation of website such as image of web site main page screenshot of web site or plain text or video simulating link activation using only text or image with no hyperlink (295).

Optionally resting server in case of detecting malicious code or risk factor above defined threshold (298).

FIG. 4 depicts a flow diagram of the safe browsing interaction between the server and mobile device browser according to some embodiments of the present invention.

The safe browsing interaction includes at least one of the following steps:

Identifying new initiation to open hyperlink by the user at any of the mobile phone (310);

Checking URL: using white/black list, analyzing name (320);

In case not whitelist or/and black list open in secure server otherwise incase white list open link at default browser, in case in black list deny access (330);

Downloading content of designated website of requested hyperlink server using normal browser (optionally by safe virtual browser using limited HTML code not including commands such as script language codes or CSS (cascading)) (340);

Checking content of designated site of requested (350);

Checking technical characteristics of the website: geo location, of servers, owner ID, name, IP address characteristics (360);

Checking website for malicious code, such as accessing phone memory or identifying Privacy violation (370);

Estimating hyper link risk factor based on all above analysis sending risk factor to mobile (380);

Creating simplified presentation of website: image of web site main page screenshot of web site or plain text and send to the mobile device (390);

Sending simplified presentation to mobile device, optionally sending analysis data (400);

At secure state enabling user to view simplified presentation or image of website, enabling to upload website at default browser upon request (410);

Optionally resting server in case of detecting malicious code or risk factor above defined threshold (420);

Optionally according to some embodiments if the present invention, in case of risk factor above predefined threshold uploading website using default browser, otherwise open website in secure browser.

Figure 5:
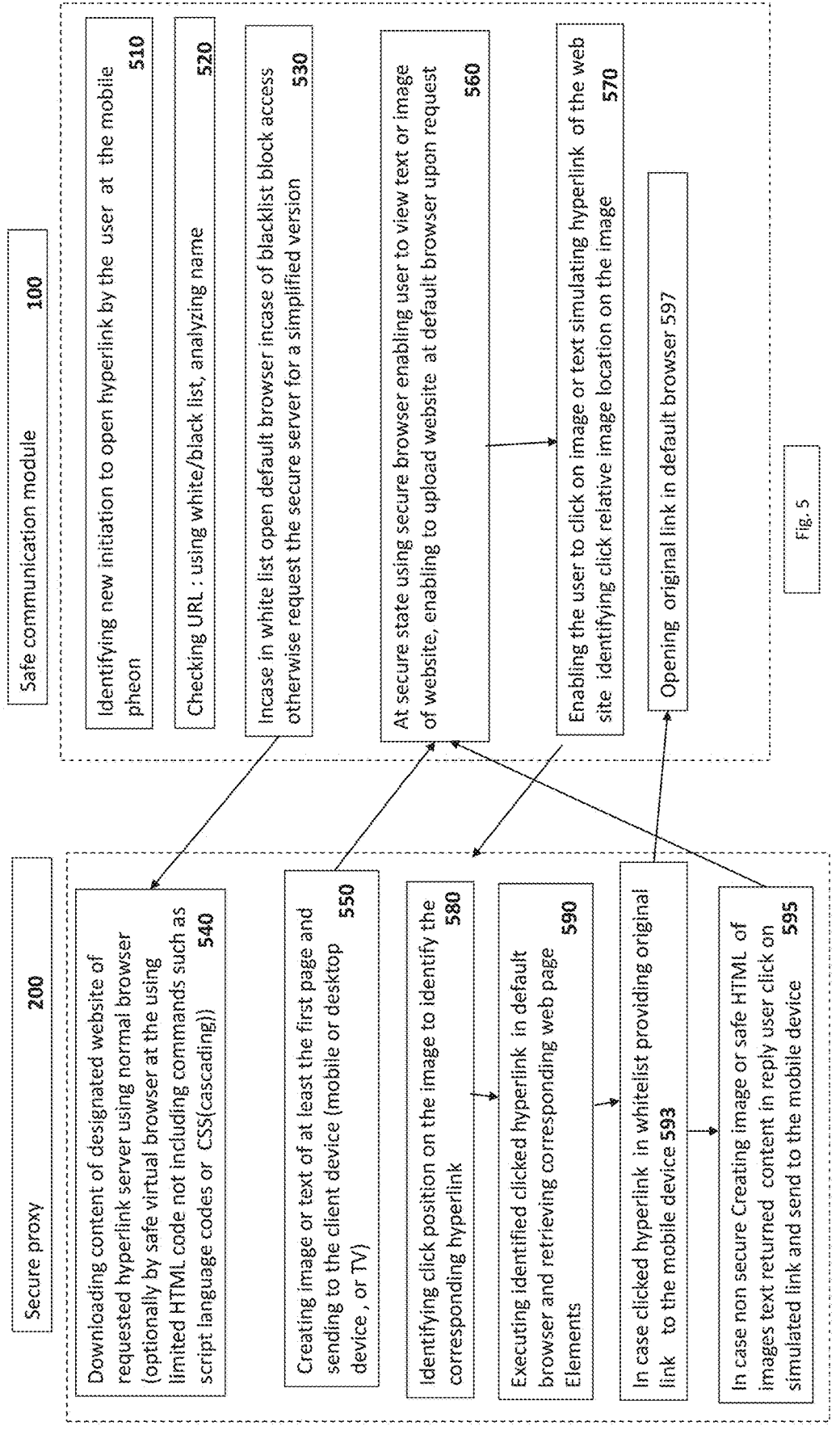
FIG. 5 depicts a flow diagram of the process carried out by server and phone according to some embodiments of the present invention.

FIG. 5 depicts a flow diagram of the safe browsing interaction between the server and mobile device browser according to some embodiments of the present invention.

The safe browsing interaction includes at least one of the following steps:

Identifying new initiation to open hyperlink by the user at any of the mobile phone (510);

Checking URL: using white/black list, analyzing name (520);

In case in white list open default browser in case of blacklist block access otherwise request the secure server for a simplified version (530);

Downloading content of designated website of requested hyperlink server using normal browser (optionally by safe virtual browser at the using limited HTML code not including commands such as script language codes or CSS (cascading)) (540);

Creating image or safe HTML of at least the first page sending to the mobile (550);

At secure state enabling user to view text or image of web site, enabling to upload website at default browser upon request (560);

Enabling the user to click on image or text simulating hyperlink of the web site identifying click relative image location on the image (570);

Identifying click position on the image to identify the corresponding hyperlink (580);

Executing identified clicked hyperlink in default browser and retrieving corresponding web page Elements (590);

In case clicked hyperlink in whitelist providing original link 593 and and Opening original link in default browser (597);

In case non secure Creating image or safe HTML of images text returned content in reply user click on simulated link (595) and returning to step 560;

Optionally resting server in case of detecting malicious code or risk factor above defined threshold;

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A secure method for opening network communication link/address (URL), at computer device, said method implemented by one or more processors operatively coupled to a non-transitory computer readable storage device, on which are stored modules of instruction code that when executed cause the one or more processors to perform:

identifying initiation for opening network communication link, by designated browsing application, wherein the designated browsing application is configured only for reading and presenting content of website addressed by the communication link reading only limited HTML code, said content including only content objects of text, image, audio and video, excluding commands including script language codes or CSS (cascading style);

reading by the designated browsing application from the original HTML code only limited HTML code including only basic HTML code including only script of pre-defined commands for displaying image and text and audio and video from the webpage associated with network communication link and presenting a user with the created limited HTML; and presenting to the user the video and audio as appears in the webpage.

2. The method of claim 1 wherein in case of unknown communication link checking technical properties of communication link address and technical properties of the web site/page the commination link is addressing, estimating risk factor for the communication link, wherein in case the risk is above predefined value blocking said link.

3. The method of claim 1 further comprising the steps of checking URL by using white/black list, wherein in case of black list block access, in case of white list enable access using default browser.

4. The method of claim 1 further comprising the steps of downloading content of a designated website of requested hyperlink by safe browser.

5. The method of claim 1 further comprising the steps of downloading content of a designated website of requested hyperlink at secure server and checking content of the designated website, creating image or text of at least the first page of the designated website sending to the mobile device and at secure state using secure browser enabling user to view text or image of designated website, enabling uploading of the designated website at a default browser upon request.

6. The method of claim 1 further comprising the steps of: enabling the user to click on image or text simulating hyperlink of the web site identifying click relative image location on the image, identifying click position on the image to identify the corresponding hyperlink and executing identified clicked hyperlink in default browser and retrieving corresponding web page elements to the mobile device.

7. The method of claim 1 wherein checking technical characteristics of the web site include at least one of geo location of servers, owner ID hosting server site, and IP address characteristics.

8. The method of claim 1 further comprising the steps of checking website script for malicious code.

9. The secure method of claim 1, wherein in case link is not whitelist or black list open link in secure server, otherwise open link at default browser, wherein the secure webserver performs analysis of technical properties of communication link address and technical properties of the web site/page the commination link is addressing.

10. A secure system for opening network communication link/address (URL), comprising a computer device implemented by one or more processors operatively coupled to a non-transitory computer readable storage device, which causes a module to perform:

a designated browsing application configured for identifying initiation for opening network communication link, wherein the designated browsing application is configured only for reading and presenting the user with image/digital object having no active code, reading by the designated browsing application from the original HTML code only limited HTML including only basic HTML code including only script of predefined commands for displaying only image and text and audio and video from a webpage associated with the network communication link and not including script language codes or CSS (cascading style), and presenting to the user the video and audio as appears in the webpage.

11. The system of claim 10 wherein in case of unknown communication link checking technical properties of communication link address and technical properties of the web site/page the commination link is addressing, estimating risk factor for the communication link, wherein in case the risk is above predefined value blocking said link.

12. The system of claim 10 wherein the designated browsing application further checks the URL using white/black list and analyzing name of URL.

13. The system of claim 10 wherein the designated browsing application further perform downloading content of a designated website of requested hyperlink by safe browser.

14. The system of claim 10 wherein the designated browsing application further perform downloading content of a designated website of requested hyperlink at secure server and checking content of the designated website of requested hyperlink.

15. The system of claim 10 wherein checking technical characteristics of the web site include at least one of geo location, of servers, owner ID, hosting server site, name, IP address characteristics, structure of web page.

16. The system of claim 10 wherein the designated browsing application further checks website script for malicious code, which enables access to phone memory.

17. The system of claim 10 wherein the designated browsing application further estimates hyper link risk factor based on analysis of link technical characteristics, wherein in case of risk factor above predefined threshold uploading website using default browser, otherwise open website in secure browser.

18. The secure system of claim 10 wherein in case link is not a whitelist, open link in secure server, otherwise open link at default browser, wherein the secure webserver performs analysis of technical properties of communication link address and technical properties of the web site/page the commination link is addressing.

* * * * *